(12) United States Patent
Hirota

(10) Patent No.: US 8,472,742 B2
(45) Date of Patent: Jun. 25, 2013

(54) SIGNAL PROCESSING DEVICE, SIGNAL PROCESSING METHOD, AND PROGRAM

(75) Inventor: Yoichi Hirota, Kanagawa (JP)

(73) Assignee: Sony Corporation (JP)

( * ) Notice: Subject to any disclaimer, the term of this patent is extended or adjusted under 35 U.S.C. 154(b) by 346 days.

(21) Appl. No.: 12/930,956

(22) Filed: Jan. 20, 2011

(65) Prior Publication Data

US 2011/0181705 A1    Jul. 28, 2011

(30) Foreign Application Priority Data

Jan. 28, 2010   (JP) ................................ P2010-017361

(51) Int. Cl.
*G06K 9/40*      (2006.01)
*G06T 5/00*      (2006.01)

(52) U.S. Cl.
CPC ....................................... *G06T 5/001* (2013.01)
USPC ............................ 382/254; 382/154; 382/274

(58) Field of Classification Search
USPC ................................................... 382/154, 274
See application file for complete search history.

(56) References Cited

U.S. PATENT DOCUMENTS

| 5,715,334 | A | * | 2/1998 | Peters ........................... 382/254 |
| 7,800,691 | B2 | | 9/2010 | Oyaizu et al. |
| 2003/0156188 | A1 | * | 8/2003 | Abrams, Jr. ..................... 348/51 |
| 2009/0059082 | A1 | * | 3/2009 | Jakobovits .................... 348/673 |
| 2009/0196525 | A1 | | 8/2009 | Tsukamoto et al. |
| 2010/0079482 | A1 | | 4/2010 | Tsukamoto et al. |

FOREIGN PATENT DOCUMENTS

| JP | 2006-221060 A | 8/2006 |
| JP | 2009-151151 A | 7/2009 |
| JP | 2009-207113 A | 9/2009 |

* cited by examiner

*Primary Examiner* — Sath V Perungavoor
*Assistant Examiner* — Dakshesh Parikh
(74) *Attorney, Agent, or Firm* — Lerner, David, Littenberg, Krumholz & Mentlik, LLP

(57) ABSTRACT

A signal processing device configured to produce a first output video signal and a second output video signal as video signals for right and left eyes in a stereoscopic video, the first and second output video signals each having a predetermined number of output gradation steps, from a first input video signal and a second input video signal, the first and second input video signals each having a predetermined number of input gradation steps. A predetermined gradation value difference is produced between the gradation values of the first output video signal and the gradation values of the second output video signal to express a higher number of gradation steps than the number of output gradation steps in the stereoscopic video.

5 Claims, 9 Drawing Sheets

FIG. 3
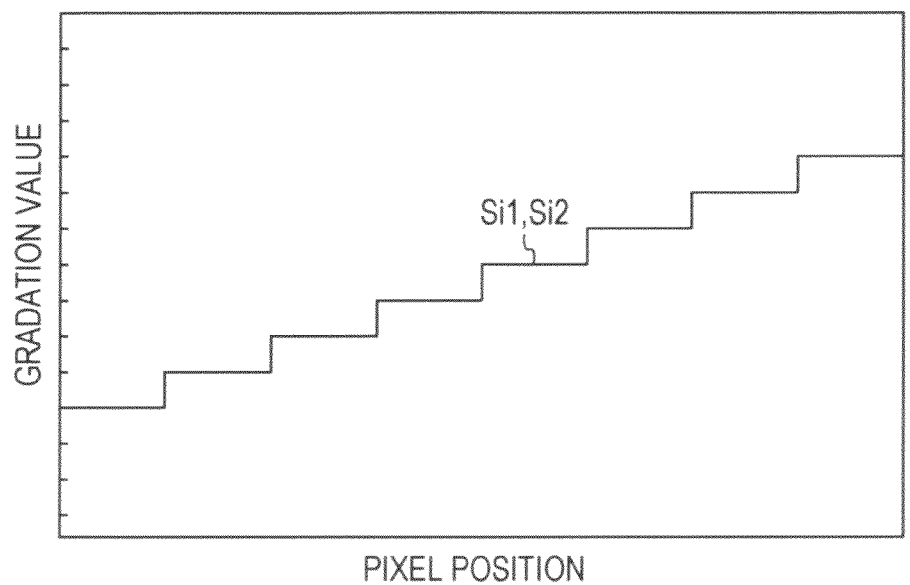
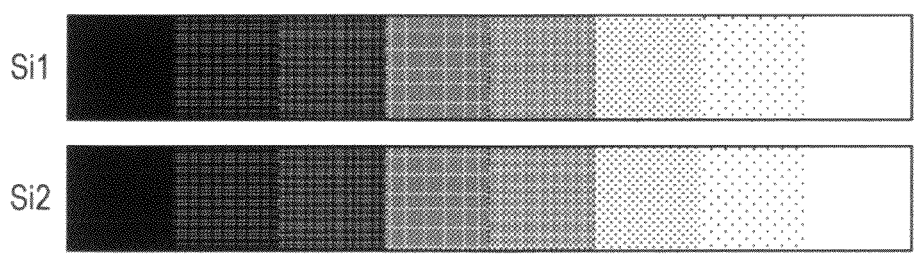

FIG. 4
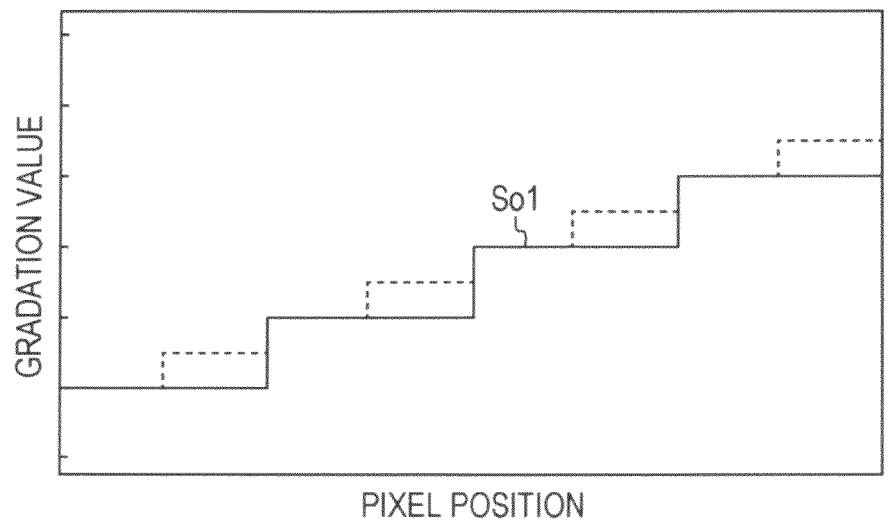
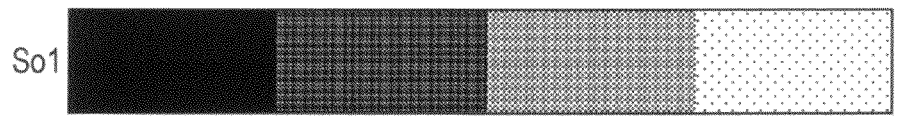
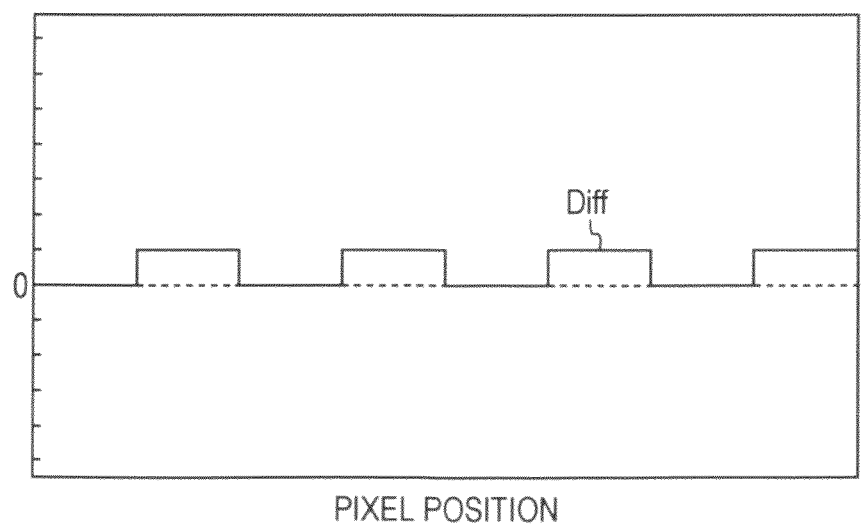

SIGNAL PROCESSING DEVICE, SIGNAL PROCESSING METHOD, AND PROGRAM

CROSS-REFERENCE TO RELATED APPLICATION

The present application claims priority from Japanese Patent Application No. JP 2010-017361 filed in the Japanese Patent Office on Jan. 28, 2010, the entire content of which is incorporated herein by reference.

BACKGROUND OF THE INVENTION

1. Field of the Invention

The present invention generally relates to a signal processing device, signal processing method, and program, and in particular relates to a signal processing device, signal processing method, and program for gradation expression in video signals.

2. Description of the Related Art

Gradation in a video signal is originally smooth, having an infinite number of gradation steps. However, a digital video signal, which is a quantized video signal, has a gradation rounded off to a finite number of gradation steps, such as 256 gradation steps expressed by eight bits, for example. The digital video signal is therefore incapable of expressing the gradation of the original video signal. Various techniques have been proposed to make the gradation expression in the digital video signal as close to the original video signal as possible.

Related techniques include, for example, a frame rate control (FRC) method that expresses intermediate gradation steps utilizing the integration effect of visual perceptions in the time direction by changing the gradation frame by frame, as well as techniques for expressing intermediate gradation steps utilizing the spatial integration effect of visual perceptions by changing the gradation pixel by pixel, such as error diffusion, super bit mapping (SBM), and dithering. As disclosed in Japanese Unexamined Patent Application Publication Nos. 2006-221060 and 2009-207113, for example, these techniques are being improved.

On the other hand, as disclosed in Japanese Unexamined Patent Application Publication No. 2009-151151, for example, provision of stereoscopic video is becoming common in recent years. The stereoscopic video is provided by showing video images shifted by the amount of parallax to the right and left eyes of the viewer so that the viewer perceives a single three dimensional video image. The above problem of gradation expression also occurs in the provision of stereoscopic video as long as the video images shown to the right and left eyes are formed from digital video signals.

SUMMARY OF THE INVENTION

The above techniques for improving the gradation expression of digital video signals have problems such as, for example, perceivable flickering in the video images relying on the integration of visual perceptions in the time direction, as well as visible noises and patterns in the video images relying on the spatial integration of visual perceptions.

It is desirable to provide a novel and improved signal processing device, signal processing method, and program that are capable of providing naturally-looking stereoscopic video images with a higher number of gradation steps beyond the output format and display hardware characteristics.

In an embodiment of the present invention, there is provided a signal processing device configured to produce a first output video signal and a second output video signal for right and left eyes in a stereoscopic video, the first and second output video signals each having a predetermined number of output gradation steps, from a first input video signal and a second input video signal, the first and second input video signals each having a predetermined number of input gradation steps. The signal processing device produces a predetermined gradation value difference between the gradation values of the first output video signal and the gradation values of the second output video signal to express a higher number of gradation steps than the number of output gradation steps in a stereoscopic video.

This enables video images having a predetermined gradation value difference to be perceived by the right and left eyes in a stereoscopic video. If the predetermined gradation value difference is small, intermediate gradation values, which are the mean values of the gradation values perceived by the right and left eyes, can be recognized by the viewer. This means that the video images can be expressed with a higher number of gradation steps beyond the output format and display hardware characteristics. Since the gradation values of the perceived video images do not vary temporally or spatially, it is possible to provide naturally-looking video images without flickering or noise.

Here, the number of output gradation steps may be less than the number of input gradation steps and the gradation value difference may be produced by rounding off the gradation values in the first input video signal to the number of output gradation steps to produce the first output video signal, calculating the gradation value difference due to rounding between the first input video signal and the first output video signal, and adding the gradation value difference due to rounding to the second input video signal and rounding off the resultant second input video signal to the number of output gradation steps to produce the second output video signal.

Alternatively, the number of input gradation steps and the number of output gradation steps may be a common number of gradation steps and the gradation value difference may be produced by generating a correction signal having a higher number of correction signal gradation steps than the common number of gradation steps, adding the correction signal gradation values rounded down to the common number of gradation steps to the first input video signal to produce the first output video signal, and adding the correction signal gradation values rounded up to the common number of gradation steps to the second input video signal to produce the second output video signal.

In another embodiment of the present invention, there is provided a signal processing method for generating a first output video signal and a second output video signal for right and left eyes in a stereoscopic video, the first and second output video signals each having a predetermined number of output gradation steps, from a first input video signal and a second input video signal, the first and second input video signals each having a predetermined number of input gradation steps. A predetermined gradation value difference is produced between the gradation values of the first output video signal and the gradation values of the second output video signal to express a higher number of gradation steps than the number of output gradation steps in a stereoscopic video.

In still another embodiment of the present invention, there is provided a program executed by a computer for generating a first output video signal and a second output video signal for right and left eyes in a stereoscopic video, the first and second output video signals each having a predetermined number of output gradation steps, from a first input video signal and a second input video signal, the first and second input video signals each having a predetermined number of input gradation steps. A predetermined gradation value difference is produced between the gradation values of the first output video signal and the gradation values of the second output video signal to express a higher number of gradation steps than the number of output gradation steps in a stereoscopic video.

As described above, according to the embodiment of the present invention, naturally-looking video images can be provided with a higher number of gradation steps in a stereoscopic video beyond the output format and display hardware characteristics.

BRIEF DESCRIPTION OF THE DRAWINGS

FIG. 3 illustrates gradation values of the first and second input video signals according to the embodiment;

FIG. 4 illustrates gradation values of the first output video signal and gradation value differences due to rounding according to the embodiment;

DESCRIPTION OF THE PREFERRED EMBODIMENTS

Figure 1:
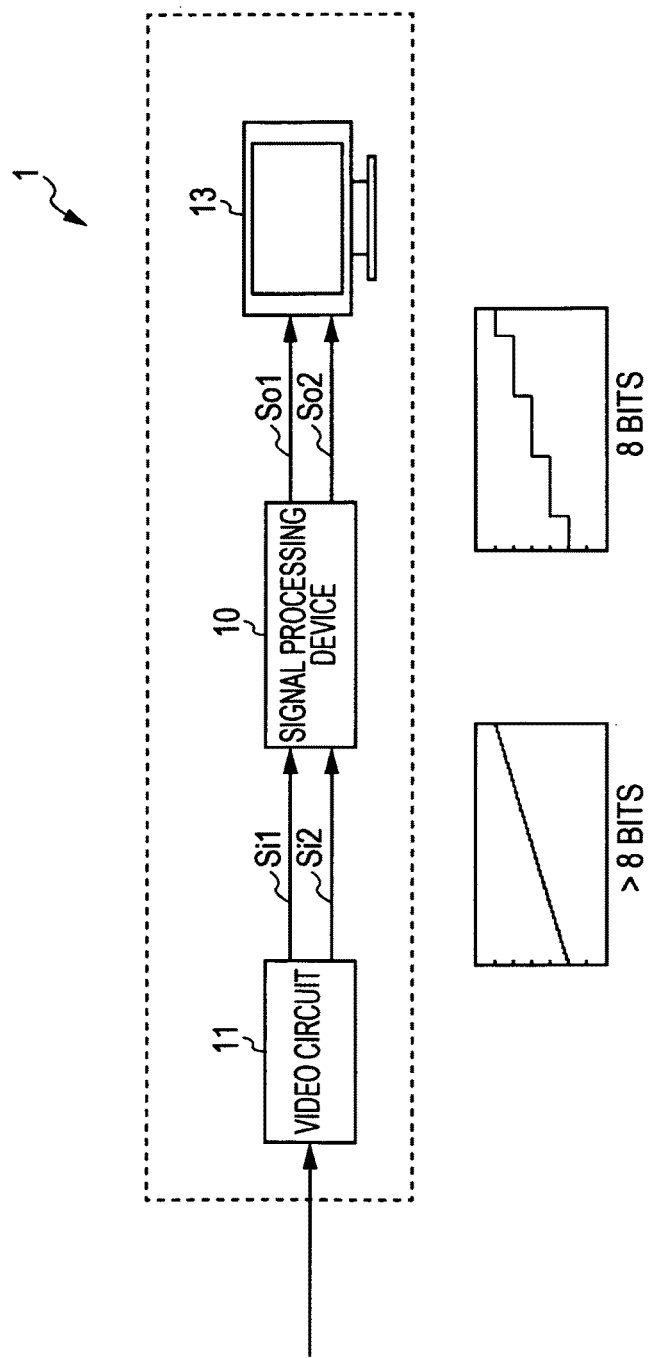
FIG. 1 illustrates an example of functional arrangement of a stereoscopic video display apparatus in which a signal processing device according to an embodiment of the present invention is applied.

Preferred embodiments of the present invention will now be described with reference to the accompanying drawings. Components having substantially identical functional arrangements are denoted with identical reference characters throughout the specification and drawings and duplicated description thereof is omitted.

The description will be given in the following order:
1. Explanation of Terms
2. Description of Embodiments
2-1. Embodiment (an exemplary signal processing device performing gradation conversion)
2-1-1. Application
2-1-2. Processing in Detail
2-1-3. Variation
2-1-4. Remarks
2-2. Another Embodiment (an exemplary signal processing device performing gradation correction)
2-2-1. Application
2-2-2. Processing in Detail
3. Supplementary Note

1. EXPLANATION OF TERMS

Several terms used in the description of the embodiments of the present invention will now be explained.

The term "gradation" typically refers to a color variation or the smoothness of color variation. It also refers herein to a variation in brightness, contrast, or the like expressed by continually varying values, similarly to the colors, in the representation of video images.

The term "gradation value" refers to a numerical value representing each gradation step in a video signal. An original video signal is expressed by gradation values smoothly varying in an infinite number of steps.

The "number of gradation steps" indicates the number of values that the gradation steps can assume in a digital signal, which is a quantized video signal. For example, the number of gradation steps that can be expressed by an 8-bit digital signal is $2^8=256$ and one gradation step is expressed by one of the 256 gradation values.

2. DESCRIPTION OF EMBODIMENTS 2-1. Embodiment

An Exemplary Signal Processing Device Performing Gradation Conversion (2-1-1. Application)

As shown in FIG. 1, a signal processing device 10 according to an embodiment of the present invention is applicable to a stereoscopic video display apparatus 1, for example. In this case, the signal processing device 10 is disposed between a video circuit 11 and a display unit 13.

The video circuit 11 processes, for example, broadcast signals for digital broadcasting and signals coming from external devices, such as blu-ray disc/digital versatile disc (BD/DVD) players, using various units including a tuner, demultiplexer, decoder, and noise reduction unit, depending on the signal types.

The video circuit 11 generates a first input video signal Si1 and a second input video signal Si2 and inputs the generated signals to the signal processing device 10. The first input video signal Si1 and second input video signal Si2 are digital video signals, one of them corresponding to the video image for the right eye and the other corresponding to the video image for the left eye in a stereoscopic video.

The signal processing device 10 generates a first output video signal So1 and a second output video signal So2 from the first input video signal Si1 and the second input video signal Si2 and outputs the generated signals to the display unit 13. The first output video signal So1 and second output video signal So2 are digital video signals, one of them corresponding to the video image for the right eye and the other corresponding to the video image for the left eye in a stereoscopic video.

The display unit 13 generates video images for the right and left eyes in a stereoscopic video from the first output video signal So1 and second output video signal So2 and provides the video images for the viewer. Many techniques exist for stereoscopic video presentation, in addition to those presented as the related techniques described above. The display unit 13 employs one of the existing techniques.

The digital video signal used in the stereoscopic video display apparatus 1 has a predetermined number of bits that can be used for data encoding and defines a predetermined number of gradation steps that can be expressed by the number of bits. The number of gradation steps of the first input video signal Si1 and second input video signal Si2 is referred to here as the number of input gradation steps, while the number of gradation steps of the first output video signal So1 and second output video signal So2 is referred to as the number of output gradation steps.

In this case, the number of input gradation steps is determined by the performance of the video circuit 11, while the number of output gradation steps is determined by the performance of the display unit 13. It is assumed in the present embodiment that the number of bits of a digital video signal displayable on the display unit 13 is limited by the high-definition multimedia interface (HDMI) or other output format and hardware characteristics and is less than the number of bits of the digital video signal generated by the video circuit 11. In this case, the number of output gradation steps is less than the number of input gradation steps.

It is assumed here, for example, that the number of input bits, i.e., the number of bits of each of the first and second input video signals Si1, Si2, is nine, while the number of output bits, i.e., the number of bits of each of the first and second output video signals So1, So2, is eight.

In this case, the number of input gradation steps is $2^9=512$, while the number of output gradation steps is $2^8=256$, which is one half the number of input gradation steps. The signal processing device 10 converts the digital video signal in 512 gradation steps generated by the video circuit to a digital video signal in 256 gradation steps displayable on the display unit 13.

(2-1-2. Processing in Detail)

Figure 2:
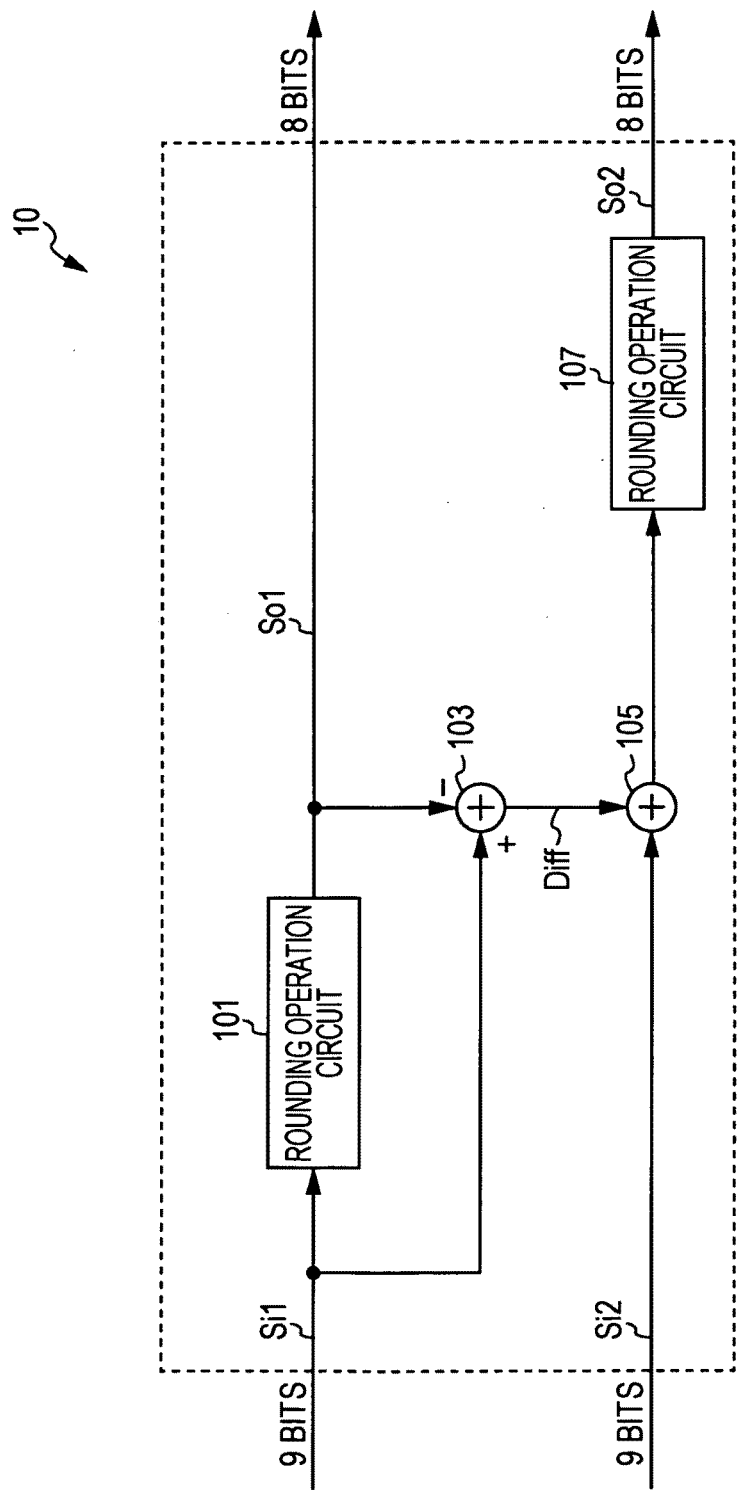
FIG. 2 illustrates a functional arrangement and operation of the signal processing device according to the embodiment.

As shown in FIG. 2, the signal processing device 10 according to the present embodiment has a processing circuit including a first rounding operation circuit 101, subtractor 103, adder 105, and second rounding operation circuit 107. This processing circuit can be implemented by a hardware logic circuit or by a software program stored in a storage unit and read out and executed by a CPU.

FIG. 3 schematically shows gradation values of the first input video signal Si1 and second input video signal Si2 at several pixel positions. Since the number of input gradation steps is 512, the gradation value of one gradation step shown in FIG. 3 is one of the 512 gradation values.

It should be noted that, since the first input video signal Si1 and second input video signal Si2 correspond to the video images for the right and left eyes in a stereoscopic video, the pixel positions of these signals are actually shifted by the amount of parallax. Although it is assumed here for simplicity that the first input video signal Si1 and second input video signal Si2 have the same gradation value at the same pixel position, the shifted amount of the pixel positions is corrected in practice using an existing technique before the signals are processed.

As shown in FIG. 4, the signal processing device 10 rounds off the gradation values of the first input video signal Si1 to the number of output gradation steps in the first rounding operation circuit 101. More specifically, the least significant bit of the nine bits expressing the 512 gradation steps of the first input video signal Si1 is rounded down to reduce the gradation steps to 256 that can be expressed by the first output video signal So1 of eight bits.

As a result, the first output video signal So1 is an 8-bit digital video signal expressing the 512 gradation steps of the first input video signal Si1 with 256 gradation steps, halving the number of gradation values. In FIG. 4, each gradation value of the first output video signal So1 covers the two corresponding gradation values of the first input video signal Si1, because the intermediate values are rounded down.

The signal processing device 10 calculates, in the subtractor 103, a gradation value difference due to rounding Diff between the first input video signal Si1 and the first output video signal So1. The gradation value difference due to rounding corresponding to the gradation values rounded down in the first rounding operation circuit 101 is shown as the gradation value difference due to rounding Diff in FIG. 4.

Next, the signal processing device 10 adds, in the adder 105, the gradation value difference due to rounding Diff to the second input video signal Si2 and, in the second rounding operation circuit 107, rounds the gradation values to the number of output gradation steps to produce a second output video signal So2. More specifically, after the gradation value difference due to rounding Diff is added to the second input video signal Si1, the least significant bit of the nine bits expressing the 512 gradation values of the second input video signal Si2 is rounded down to reduce the number of gradation values to 256 that can be expressed by the second output video signal So2 of eight bits.

Figure 5:
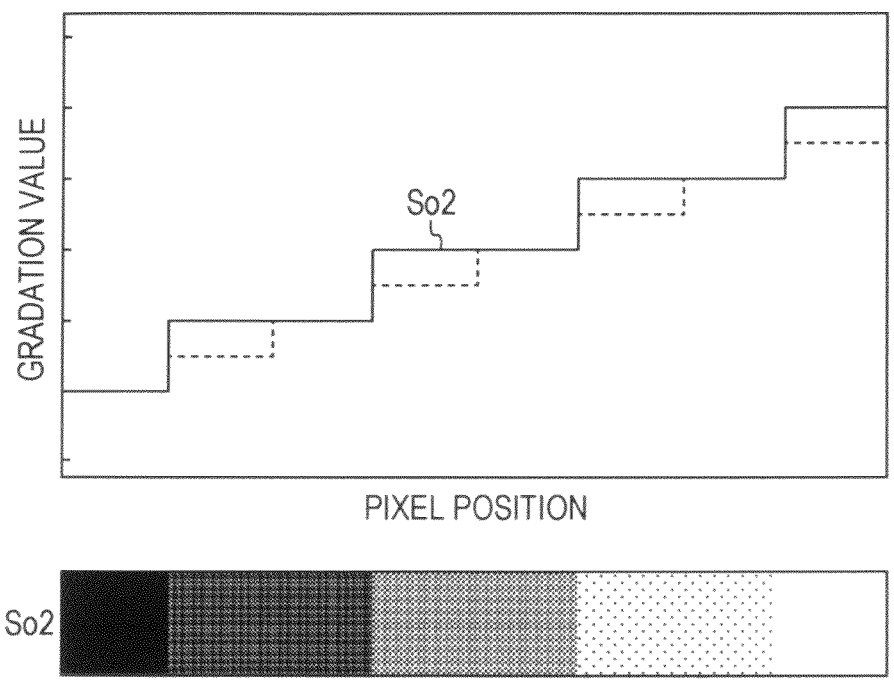
FIG. 5 illustrates gradation values of the second output video signal according to the embodiment.

As shown in FIG. 5, since the Diff is added to the second input video signal Si2 and all the intermediate values are thus carried up, the second output video signal So2 is an 8-bit digital video signal having 256 gradation values, which is the same result as rounding up the gradation values expressed by the least significant bit in the second input video signal Si2.

Figure 6:
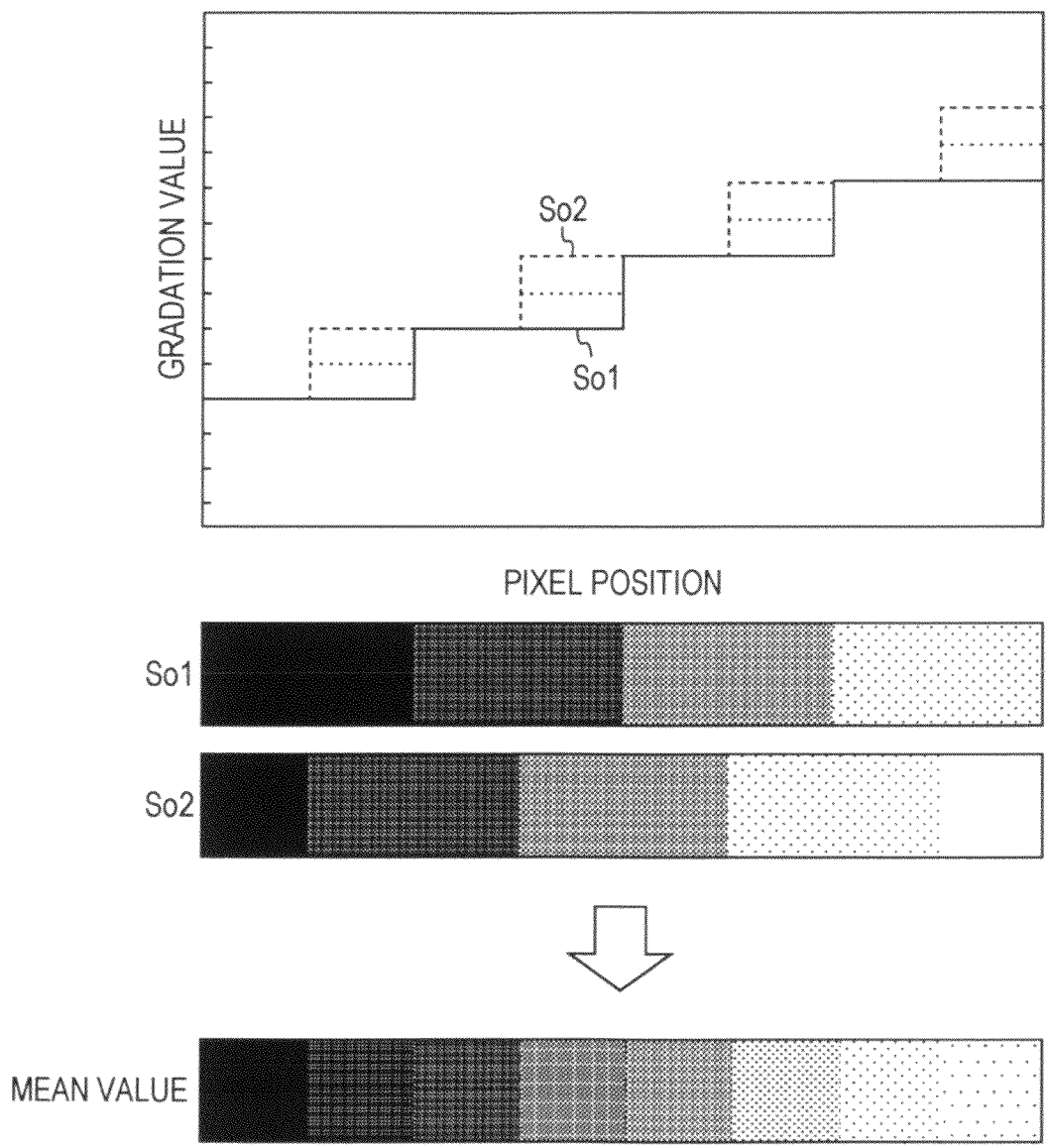
FIG. 6 illustrates gradation values of the first and second output video signals according to the embodiment.

As shown in FIG. 6, as a result of the above processing, a predetermined gradation value difference is produced between the gradation values of the first output video signal So1 indicated by the solid lines and the gradation values of the second output video signal So2 indicated by the dashed lines. More specifically, at the pixel positions at which the gradation value difference due to rounding Diff is produced, the gradation values of the second output video signal So2 are higher than the corresponding gradation values of the first output video signal So1 by the amount corresponding to one step in the 256 gradation scale.

In the display unit 13 in FIG. 1, the output video signals So1 and So2 are presented to the viewer as the video images for the right and left eyes in a stereoscopic video. At the pixel positions at which a gradation value difference is produced, video images with different gradation values are perceived by the right and left eyes of the viewer.

If the gradation value difference is small, intermediate gradation values are recognized in the stereoscopic video recognized by synthesizing the video images perceived by the right and left eyes. In the case shown in FIG. 6, for example, at the pixel positions at which a gradation value difference corresponding to one gradation step in the 256 gradation scale is produced, intermediate gradation values each corresponding to one-half step in the 256 gradation scale are recognized, as indicated by the dotted lines.

The display unit 13 can originally express only 256 gradation values corresponding to the number of output gradation steps. In a stereoscopic video, however, 512 gradation steps, twice the number of output gradation steps, can be expressed because additional gradation values can be expressed by 256 one-half gradation steps as described above.

(2-1-3. Variation)

In the above description of the present embodiment, the video signal conversion processing to an 8-bit digital video signal has been described as an example. Similar processing is applicable to the video signal conversion to a digital video signal of any number of bits, because only the least significant bit(s) are used in the processing.

The difference between the number of input bits and the number of output bits is not limited to one bit as in the above example in which the conversion is made between nine bits and eight bits. Even if the difference is two or more bits, similar video signal conversion processing is applicable and the number of gradation steps corresponding to the number of output bits plus one bit can be expressed.

Figure 7:
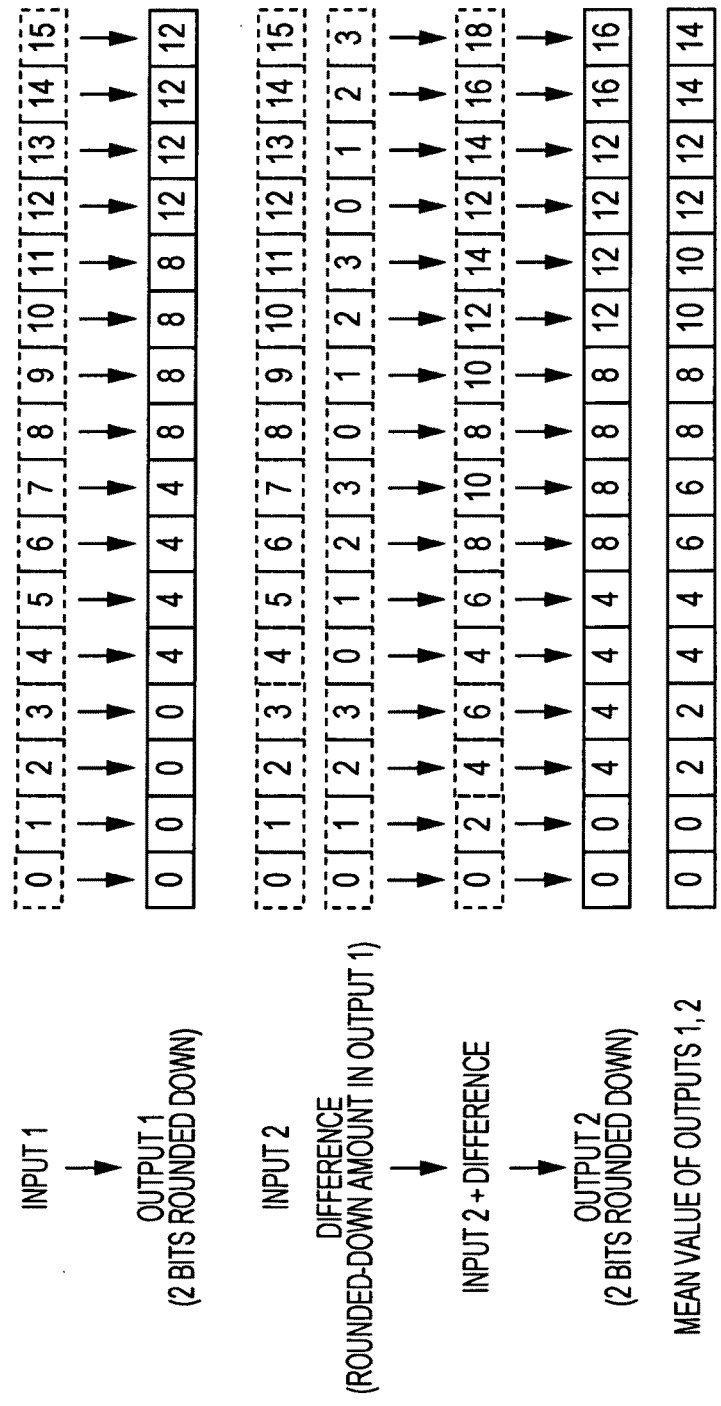
FIG. 7 illustrates 2-bit round-down processing according to a variation of the embodiment.

FIG. 7 illustrates, as a variation of the present embodiment, gradation value conversion in the case where the difference between the number of input bits and the number of output bits is two. For the sake of convenience, the gradation values are expressed in decimal notation. As shown in the processing from INPUT 1 to OUTPUT 1, when the two least significant bits are simply rounded down, the gradation values expressed in steps of one in INPUT 1 are expressed in steps of 2²=4, which means that the gradation is expressed by one fourth the original number of gradation steps.

In the example shown in FIG. 7, however, the value rounded down in OUTPUT 1 (corresponding to the gradation value difference) is added to INPUT 2 and then the two least significant bits of INPUT 2 are rounded down, resulting in a gradation value difference being produced between OUTPUT 1 and OUTPUT 2.

As a result, the mean values of OUTPUTs 1 and 2 that are recognized as the gradation values in a stereoscopic video are values in steps of 2¹=2. Thus, the gradation can be expressed with a number of gradation steps twice the number of gradation steps obtained by simply carrying out round-down processing.

(2-1-4. Remarks)

In the above description of the present embodiment, the first rounding operation circuit 101 carries out round-down processing. Alternatively the first rounding operation circuit 101 may carry out round-up processing. In this case, the difference Diff becomes a negative value and the gradation values of the output video signals So1 and So2 in the above example are replaced with each other. Similarly, the first rounding operation circuit 101 can perform any rounding processing such as a round-off operation rounding down the numbers below the center value and rounding up the numbers equal to or greater than the center value (for example, rounding five up and four down in the decimal notation).

Similarly, the second rounding operation circuit 102 can perform any rounding processing. When the difference between the number of input bits and the number of output bits is two or more, the number of gradation values expressed in the output video signal is obtained by rounding off the number of gradation values of the input video signal to the number of gradation values expressed by the number of bits of the output video signal plus one bit. This rounding processing is the same type as the rounding processing performed in the second rounding operation circuit 102. For example, when the present embodiment is applied to video signal conversion processing from 12 bits to eight bits and round-up processing is performed in the second rounding operation circuit 102, the number of gradation values expressed by the output video signal is the number of gradation values expressed by nine bits as the result of round-up operation from 12 bits to nine bits.

2-2. Another Embodiment

An Exemplary Signal Processing Device Performing Gradation Correction (2-2-1. Application)

A signal processing device 10 according to another embodiment of the present invention is applicable, similarly to the embodiment shown in FIG. 1, to the stereoscopic video display apparatus 1, for example. In the present embodiment, however, the number of bits of the digital video signal generated by the video circuit 11 is equal to the number of bits of the digital video signal that can be displayed on the display unit 13; in short, in the signal processing device 10, the number of input bits is equal to the number of output bits.

It is assumed here that both the number of input bits and the number of output bits are eight. In this case, the number of input gradation steps and the number of output gradation steps are common, i.e., 2⁸=256. The signal processing device 10 adds fine corrections beyond the output format and display hardware characteristics to the gradation values of the digital video signals generated by the video circuit 11 to display the gradation values on the display unit 13.

(2-2-2. Processing in Detail)

Figure 8:
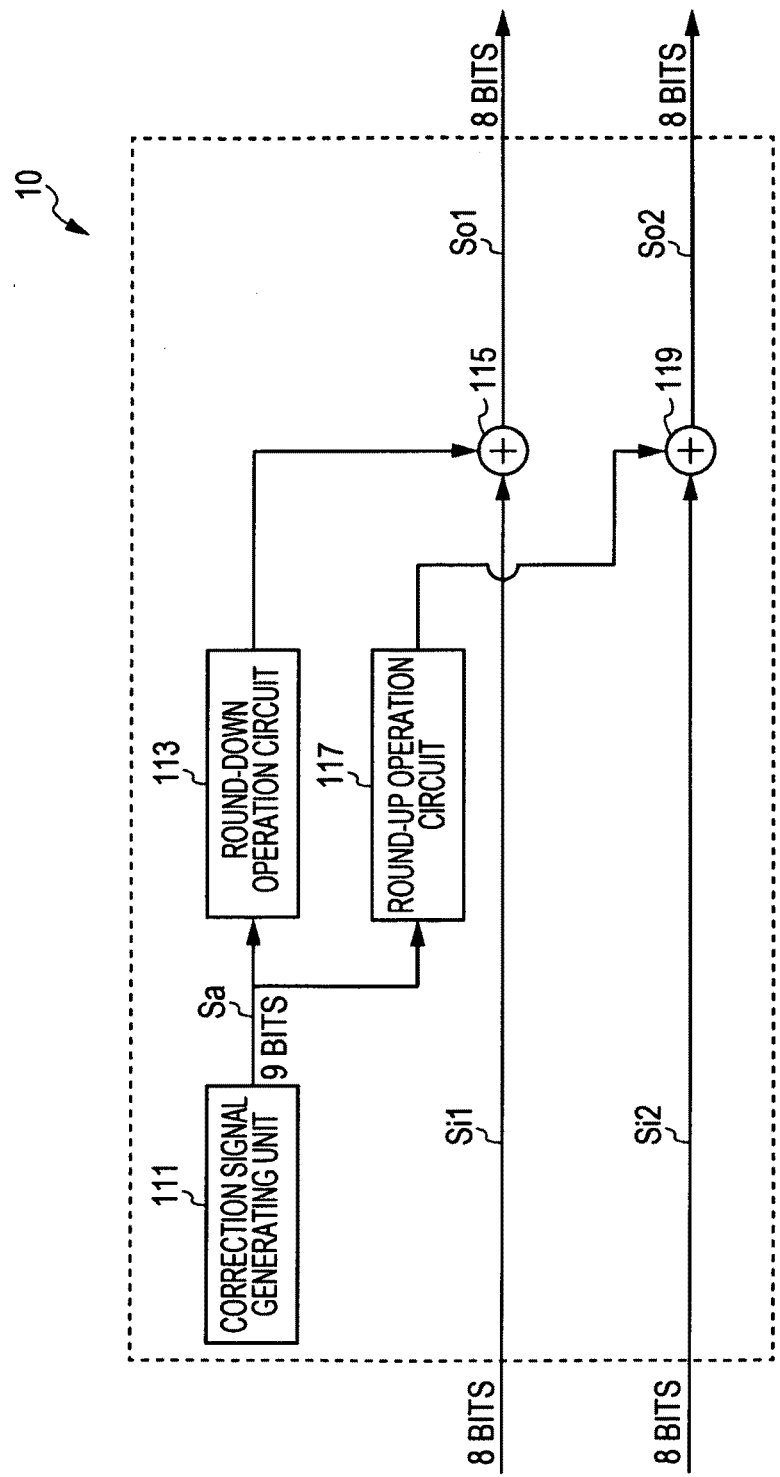
FIG. 8 illustrates the functional arrangement and operation of a signal processing device according to another embodiment of the present invention.

As shown in FIG. 8, the signal processing device 10 according to the present embodiment has a processing circuit including a correction signal generating unit 111, round-down operation circuit 113, first adder 115, round-up operation circuit 117, and second adder 119. This processing circuit can be implemented by a hardware logic circuit or by a software program stored in a storage unit and read out and executed by a CPU.

The correction signal generating unit 111 generates a correction signal Sa. The correction signal Sa has a higher number of correction signal gradation steps than the number of input gradation steps and the number of output gradation steps. It is assumed here, for example, that the correction signal Sa is a 9-bit digital video signal having 2⁹=512 correction signal gradation steps to raise the gradation values by the amount corresponding to one step in the 512 gradation scale, i.e., one half the step in the 256 gradation scale.

The correction signal generating unit 111 may automatically generate the correction signal within the signal processing device 10, or may generate the correction signal on the basis of any value received from outside the signal processing device 10.

Next, the signal processing device 10 rounds down, in the round-down operation circuit 113, the least significant bit of the gradation value of the correction signal Sa to produce a digital video signal of 256 gradation steps and adds, in the first adder 115, this signal to the first input video signal Si1 to produce a first output video signal So1.

Then, the signal processing device 10 rounds up, in the round-up operation circuit 117, the least significant bit of the gradation value of the correction signal Sa to produce a digital video signal of 256 gradation steps and adds, in the second adder 119, this signal to the second input video signal Si2 to produce a second output video signal So2.

Since the correction signal Sa corresponds to a one-half gradation step in the 256 gradation scale, the correction signal Sa becomes zero in the round-down operation circuit 113 and becomes one step in the 256 gradation scale in the round-up operation circuit 117. Thus, the first input video signal Si1 becomes the first output video signal So1 as it is without any addition, while the second output video signal So2 is produced by adding the amount corresponding to one step in the 256 gradation scale to the second input video signal Si2.

Figure 9:
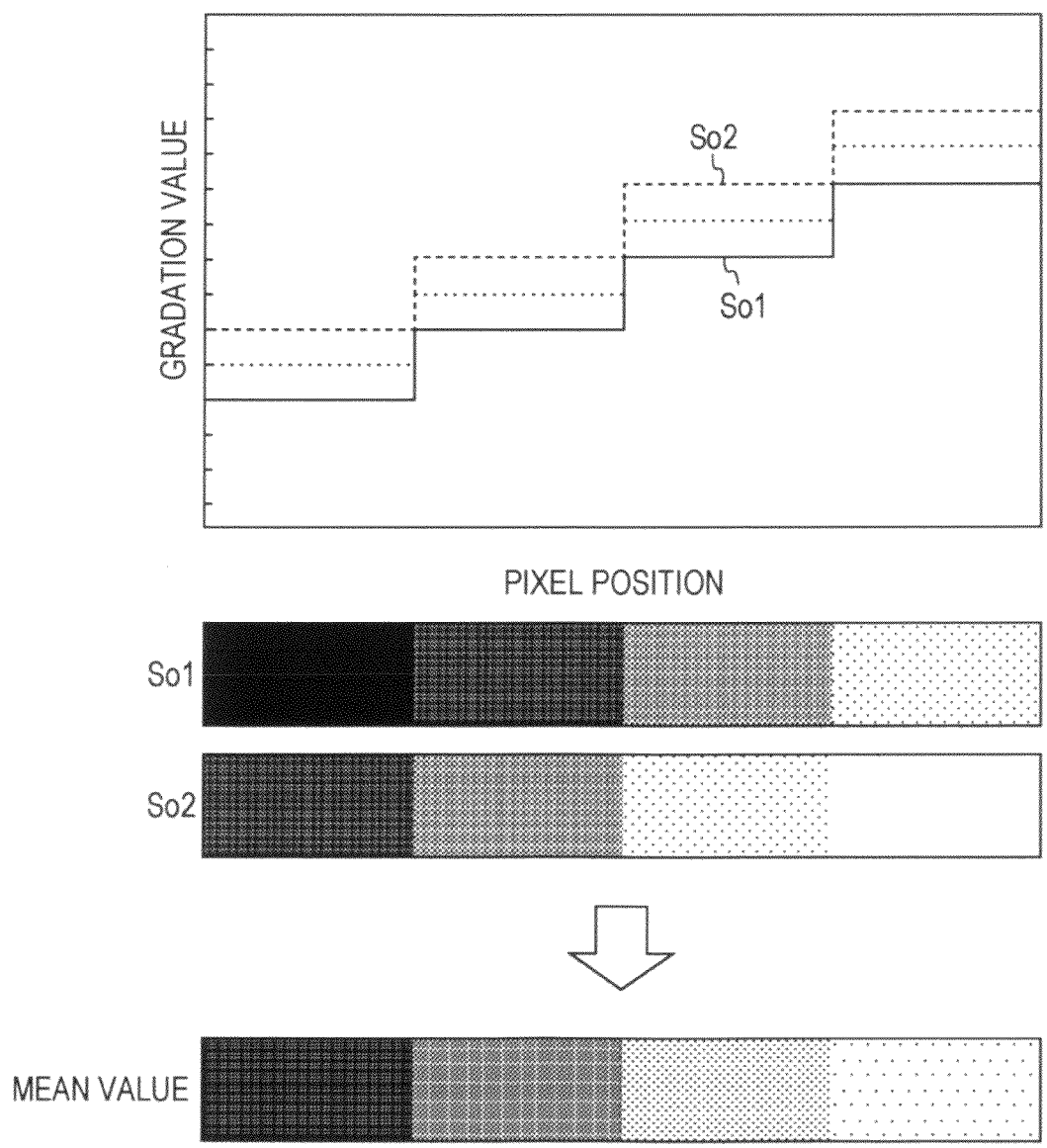
FIG. 9 illustrates gradation values of the first and second output video signals according to the embodiment.

As shown in FIG. 9, as a result of the above processing, a predetermined amount of gradation value difference is produced between the gradation values of the first output video signal So1 indicated by the solid lines and the gradation values of the second output video signal So2 indicated by the dashed lines. More specifically, the gradation values of the second output video signal So2 are higher than the gradation values of the first output video signal So1 by the amount corresponding to one step in the 256 gradation scale.

In the display unit 13 in FIG. 1, the output video signals So1 and So2 are presented to the right and left eyes of the viewer as the video images in a stereoscopic video. At the pixel positions at which a gradation value difference is produced, video images of different gradation values are perceived by the right and left eyes of the viewer.

If the gradation value difference is small, intermediate gradation values are recognized in the stereoscopic video recognized by synthesizing the video images perceived by the right and left eyes. In the entire video image, gradation values that are one-half step higher in the 256 gradation scale than the gradation values of the first and second input video signals Si1, Si2 are recognized.

The display unit 13 can originally express only 256 gradation values corresponding to the output gradation steps. In a stereoscopic video, however, since gradation values can be expressed with additional gradation values corresponding to one-half gradation steps in the 256 gradation scale as described above, fine corrections can be added to video images in 512 gradation steps, twice the number of output gradation steps.

3. SUPPLEMENTARY NOTE

Although the preferred embodiments of the present invention have been described with reference to the accompanying drawings, the present invention is not limited to these embodiments. It is obvious that a person with ordinary skill in the art to which the invention pertains will conceive of various variations and modifications without departing from the technical ideas according to an embodiment of the present invention. It should be understood therefore that those variations and modifications will naturally fall in the technical scope of the present invention.

What is claimed is:

1. A signal processing device configured to generate a first output video signal and a second output video signal as video signals for right and left eyes in a stereoscopic video, the first and second output video signals each having a predetermined number of output gradation steps, from a first input video signal and a second input video signal, the first and second input video signals each having a predetermined number of input gradation steps;
    wherein a predetermined gradation value difference is produced between gradation values of the first output video signal and gradation values of the second output video signal to express a higher number of gradation steps than the number of output gradation steps in the stereoscopic video.

2. The signal processing device according to claim 1;
    wherein the number of output gradation steps is less than the number of input gradation steps;
    wherein the signal processing device produces the gradation value difference by performing signal processing comprising the steps of:
    rounding off the gradation values in the first input video signal to the number of output gradation steps to produce the first output video signal;
    calculating a gradation value difference due to rounding between the first input video signal and the first output video signal; and
    adding the gradation value difference due to rounding to the second input video signal and then rounding off the second input video signal to the number of output gradation steps to produce the second output video signal.

3. The signal processing device according to claim 1;
    wherein the number of input gradation steps and the number of output gradation steps are a common number of gradation steps;
    wherein the signal processing device produces the gradation value difference by performing signal processing comprising the steps of:
    producing a correction signal having a higher number of correction signal gradation steps than the common number of gradation steps;
    adding the correction signal gradation values rounded down to the common number of gradation steps to the first input video signal to produce the first output video signal; and
    adding the correction signal gradation values rounded up to the common number of gradation steps to the second input video signal to produce the second output video signal.

4. A method for producing a first output video signal and a second output video signal as video signals for right and left eyes in a stereoscopic video, the first and second output video signals each having a predetermined number of output gradation steps, from a first input video signal and a second input video signal, the first and second input video signals each having a predetermined number of input gradation steps;
    wherein a predetermined gradation value difference is produced between gradation values of the first output video signal and gradation values of the second output video signal to express a higher number of gradation steps than the number of output gradation steps in the stereoscopic video.

5. A non-transitory readable medium having stored there on a program for producing a first output video signal and a second output video signal as video signals for right and left eyes in a stereoscopic video, the first and second output video signals each having a predetermined number of output gradation steps, from a first input video signal and a second input video signal, the first and second input video signals each having a predetermined number of input gradation steps;
    wherein a predetermined gradation value difference is produced between gradation values of the first output video signal and gradation values of the second output video signal to express a higher number of gradation steps than the number of output gradation steps in the stereoscopic video.

* * * * *